(12) United States Patent
Uenishi et al.

(10) Patent No.: US 10,822,677 B2
(45) Date of Patent: Nov. 3, 2020

(54) FORGED COMPONENT, METHOD FOR MANUFACTURING THE SAME, AND CONNECTING ROD

(71) Applicants: AICHI STEEL CORPORATION, Tokai-shi (JP); TOYOTA JIDOSHA KABUSHIKI KAISHA, Toyota-shi (JP)

(72) Inventors: Takeyuki Uenishi, Aichi (JP); Susumu Owaki, Aichi (JP); Hisanori Koma, Aichi (JP); Tomoyasu Kitano, Aichi (JP); Kazuhiro Tanahashi, Aichi (JP); Nobuyuki Shinohara, Gifu (JP)

(73) Assignees: AICHI STEEL CORPORATION, Tokai-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 821 days.

(21) Appl. No.: 14/762,367

(22) PCT Filed: Mar. 18, 2014

(86) PCT No.: PCT/JP2014/057223
§ 371 (c)(1),
(2) Date: Jul. 21, 2015

(87) PCT Pub. No.: WO2014/148456
PCT Pub. Date: Sep. 25, 2014

(65) Prior Publication Data
US 2015/0354042 A1     Dec. 10, 2015

(30) Foreign Application Priority Data
Mar. 20, 2013   (JP) ................... 2013-057444

(51) Int. Cl.
    *C22C 38/00*     (2006.01)
    *C22C 38/02*     (2006.01)
    (Continued)

(52) U.S. Cl.
    CPC .............. *C22C 38/00* (2013.01); *C21D 6/004* (2013.01); *C21D 6/005* (2013.01); *C21D 6/008* (2013.01);
    (Continued)

(58) Field of Classification Search
    CPC ......... C22C 38/02; C22C 38/04; C22C 38/06; C22C 38/42; C22C 38/44; C22C 38/46; C22C 38/60
    (Continued)

(56) References Cited

U.S. PATENT DOCUMENTS 6,083,455 A     7/2000    Kurita et al.
7,005,017 B2     2/2006    Robelet
(Continued)

FOREIGN PATENT DOCUMENTS

CN     101405418 A     4/2009
CN     101883874 A     11/2010
(Continued)

OTHER PUBLICATIONS

English language machine translation of JP2005054228 to Iwaki et al. Generated Oct. 3, 2019 (Year: 2019).*

(Continued)

*Primary Examiner* — Brian D Walck
(74) *Attorney, Agent, or Firm* — Oblon, McClelland, Maier & Neustadt, L.L.P.

(57) ABSTRACT

A forged component having a chemical composition including, by mass %, C: 0.30 to 0.45%, Si: 0.05 to 0.35%, Mn: 0.50 to 0.90%, P: 0.030 to 0.070%, S: 0.040 to 0.070%, Cr: 0.01 to 0.50%, Al: 0.001 to 0.050%, V: 0.25 to 0.35%, Ca:

(Continued)

0 to 0.0100%, N: 0.0150% or less, and the balance being Fe and unavoidable impurities, and satisfying formula 1. Metal structure is a ferrite pearlite structure, and a ferrite area ratio is 30% or more. Vickers hardness is in the range of 320 to 380 HV. 0.2% yield strength is 800 MPa or more. A Charpy V-notch impact value is in the range of 7 to 15 J/cm².

4 Claims, 7 Drawing Sheets

(51) Int. Cl.
    *C22C 38/04*     (2006.01)
    *C22C 38/06*     (2006.01)
    *C22C 38/42*     (2006.01)
    *C22C 38/44*     (2006.01)
    *C22C 38/46*     (2006.01)
    *C22C 38/60*     (2006.01)
    *C21D 8/00*     (2006.01)
    *C21D 9/00*     (2006.01)
    *C21D 6/00*     (2006.01)
    *F16C 7/02*     (2006.01)
    *F16C 9/04*     (2006.01)

(52) U.S. Cl.
    CPC .......... *C21D 8/005* (2013.01); *C21D 9/0075* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/60* (2013.01); *F16C 7/023* (2013.01); *F16C 9/045* (2013.01); *F16C 2360/22* (2013.01)

(58) Field of Classification Search
    USPC ......................................................... 148/333
    See application file for complete search history.

(56) References Cited

U.S. PATENT DOCUMENTS

2007/0006947 A1    1/2007   Ahn
2007/0256767 A1   11/2007   Ahn
2009/0047169 A1    2/2009   Anan et al.

FOREIGN PATENT DOCUMENTS

| | | | |
|---|---|---|---|
| EP | 2000553 A1 * | 12/2008 | ............... B21K 1/12 |
| JP | 5-209220 A | 8/1993 | |
| JP | 8-277437 A | 10/1996 | |
| JP | 11-350065 A | 12/1999 | |
| JP | 2000-239782 A | 9/2000 | |
| JP | 2001-192762 A | 7/2001 | |
| JP | 2003-55715 A | 2/2003 | |
| JP | 2004-277841 A | 10/2004 | |
| JP | 2005054228 * | 3/2005 | |
| JP | 2007-277705 A | 10/2007 | |
| JP | 2008-240129 A | 10/2008 | |
| JP | 2011-32545 A | 2/2011 | |
| JP | 2011-84767 A | 4/2011 | |
| JP | 2011-195862 A | 10/2011 | |
| JP | 2013-790 A | 1/2013 | |
| RU | 2 293 770 C2 | 2/2007 | |
| RU | 2 338 794 C2 | 11/2008 | |

OTHER PUBLICATIONS

Office Action dated Nov. 30, 2017 in European Patent Application No. 14 769 461.6.
Extended European Search Report dated Jan. 27, 2016 in Patent Application No. 14769461.6.
Combined Chinese Office Action and Search Report dated Jun. 1, 2016 in Patent Application No. 201480009691.X (with English language translation).
Office Action dated Jul. 20, 2018 in European Patent Application No. 14 769 461.6, 4 pages.
Combined Russian Office Action and Search Report dated Dec. 20. 2016 in Patent Application No. 2015132530 (with English language translation).
Notification of Reasons for Refusal dated Jul. 21, 2016 in Korean Patent Application No. 10-2015-7021459 (with machine English translation).
International Search Report dated Jun. 17, 2014 in PCT/JP2014/057223 filed Mar. 18, 2014.
Examination Report dated Mar. 25, 2019 in Indian Patent Application No. 5382/DELNP/2015, filed Jun. 18, 2015 with English translation.
Written Opinion dated May 14, 2019 in Brazilian Patent Application No. BR112015020540-2 filed Mar. 18, 2014, with English translation, 10 pages.
Rejection Decision dated Jan. 2, 2020 in Brazilian Patent Application No. BR112015020540-2 filed Mar. 14. 2014, with English translation, 7 pages.

* cited by examiner

FORGED COMPONENT, METHOD FOR MANUFACTURING THE SAME, AND CONNECTING ROD

TECHNICAL FIELD

The present invention relates to a forged component, a method for manufacturing the same, and a connecting rod.

BACKGROUND ART

The weight saving for the improvement in fuel consumption is required for a forged component used for motor vehicles, such as a connecting rod. It is effective in weight saving to increase the strength of a steel material to reduce its thickness. However, an increase in the strength of steel generally leads to deterioration of machinability. For this reason, the development of steel that satisfies both increase in strength and maintaining machinability is desired.

Further, it has been investigated that when a set of components is formed by combining two components, the two components are first molded in a state where the two components are coupled, and then the coupled component is finally fracture-split to produce the two components. When this manufacturing method is employed, rationalization of a manufacturing process can be achieved, and assemblability of the two components after fracture splitting is improved. In order to make such a manufacturing method possible, steel which at least can be easily fracture-split is required.

For example, Patent Document 1 describes steel which has been developed for the purpose of increasing strength and reducing cost. Further, for example, Patent Document 2 describes steel which has been developed for the purpose of increasing strength and improving machinability.

PRIOR ART DOCUMENTS

Patent Documents

Patent Document 1: JP-A-2011-32545
Patent Document 2: JP-A-2011-195862

SUMMARY OF THE INVENTION

Problem to be Solved by the Invention

The steel described in Patent Document 1 has achieved an increase in strength and a reduction in cost to some extent, but fracture splittability as described above is not taken into consideration at all. Further, the steel described in Patent Document 2 has achieved an increase in strength to some extent and has a property that allows fracture splitting. However, although the machinability of this steel is improved more than before, the machinability still cannot be said to be sufficient. Further, although fracture splittability is evaluated by deformation by a percent brittle fracture, chips occurring by being too brittle are not taken into consideration at all. Therefore, the steel of Patent Document 1 has a problem in deformation and chips occurring during fracture splitting.

Further, an extremely low Charpy impact value is a problem not only in terms of fracture splittability but also in terms of using the steel as a component stable for a long period of time. Thus, a minimum Charpy impact value required for durability needs to be secured.

The present invention intends to provide, based on such a background, a fracture-splittable forged component made of a steel material that can achieve an improvement in all the three properties of strength, machinability, and fracture splittability, and to provide a method for manufacturing the same. Note that although a forged component which is intended to be obtained in the present invention is fracture-splittable, the forged component may naturally be used without fracture splitting depending on applications.

Means for Solving the Problem

One aspect of the present invention resided in a forged component having a chemical composition including, by mass %, C: 0.30 to 0.45%, Si: 0.05 to 0.35%, Mn: 0.50 to 0.90%, P: 0.030 to 0.070%, S: 0.040 to 0.070%, Cr: 0.01 to 0.50%, Al: 0.001 to 0.050%, V: 0.25 to 0.35%, Ca: 0 to 0.0100%, N: 0.0150% or less, and the balance being Fe and unavoidable impurities, and satisfying the following formula 1:

$$[C]-4\times[S]+[V]-25\times[Ca]<0.44 \quad \text{Formula 1:}$$

(wherein [X] means a value of the content (mass %) of an element X), wherein metal structure is a ferrite pearlite structure, and a ferrite area ratio is 30% or more;

Vickers hardness is in the range of 320 to 380 HV;

0.2% yield strength is 800 MPa or more; and a Charpy V-notch impact value is in the range of 7 to 15 J/cm$^2$.

Another aspect of the present invention resides in a method for manufacturing a forged component including:

a step of preparing a steel material for forging having a chemical composition including, by mass %, C: 0.30 to 0.45%, Si: 0.05 to 0.35%, Mn: 0.50 to 0.90%, P: 0.030 to 0.070%, S: 0.040 to 0.070%, Cr: 0.01 to 0.50%, Al: 0.001 to 0.050%, V: 0.25 to 0.35%, Ca: 0 to 0.0100%, N: 0.0090% or less, and the balance being Fe and unavoidable impurities, and satisfying the following formula 1:

$$[C]-4\times[S]+[V]-25\times[Ca]<0.44 \quad \text{Formula 1:}$$

(wherein [X] means a value of the content (mass %) of an element X);

a step of subjecting the steel material for forging to hot forging at a hot forging temperature of 1150° C. to 1300° C. to obtain a forged component; and a cooling step of cooling the forged component after the hot forging so that an average cooling rate from 800 to 600° C. may be 150 to 250° C./min.

Further another aspect of the present invention resides in a method for manufacturing a forged component including:

a step of preparing a steel material for forging having a chemical composition including, by mass %, C: 0.30 to 0.45%, Si: 0.05 to 0.35%, Mn: 0.50 to 0.90%, P: 0.030 to 0.070%, S: 0.040 to 0.070%, Cr: 0.01 to 0.50%, Al: 0.001 to 0.050%, V: 0.25 to 0.35%, Ca: 0 to 0.0100%, N: more than 0.0090 to 0.0150%, and the balance being Fe and unavoidable impurities, and satisfying the following formula 1:

$$[C]-4\times[S]+[V]-25\times[Ca]<0.44 \quad \text{Formula 1:}$$

(wherein [X] means a value of the content (mass %) of an element X);

a step of subjecting the steel material for forging to hot forging at a hot forging temperature of 1230° C. to 1300° C. to obtain a forged component; and a cooling step of cooling the forged component after the hot forging so that an average cooling rate from 800 to 600° C. may be 150 to 250° C./min.

Effects of the Invention

The above forged component has the above specific chemical composition, and all the properties represented by Vickers hardness, 0.2% yield strength, metal structure, and a Charpy impact value are within the specific range as described above. Thereby, achievement of excellent properties that high strength is maintained, while machinability is good, and chips and deformation do not occur during fracture splitting, that is, improvement in all the three properties of strength, machinability, and fracture splittability, can be achieved on a high level. Note that the above forged component may be manufactured without performing fracture splitting depending on applications. In addition, the above forged component can be used without anxiety over a long period of time because the forged component has secured properties such as the above Charpy impact value irrespective of being subjected to fracture separation or not.

BRIEF DESCRIPTION OF THE DRAWINGS

FIG. 1 FIG. 1A shows a plan view of a test piece for evaluating fracture splittability in Example 1 and FIG. 1B shows a front view of the same test piece.

MODE FOR CARRYING OUT THE INVENTION

Figure 1A:
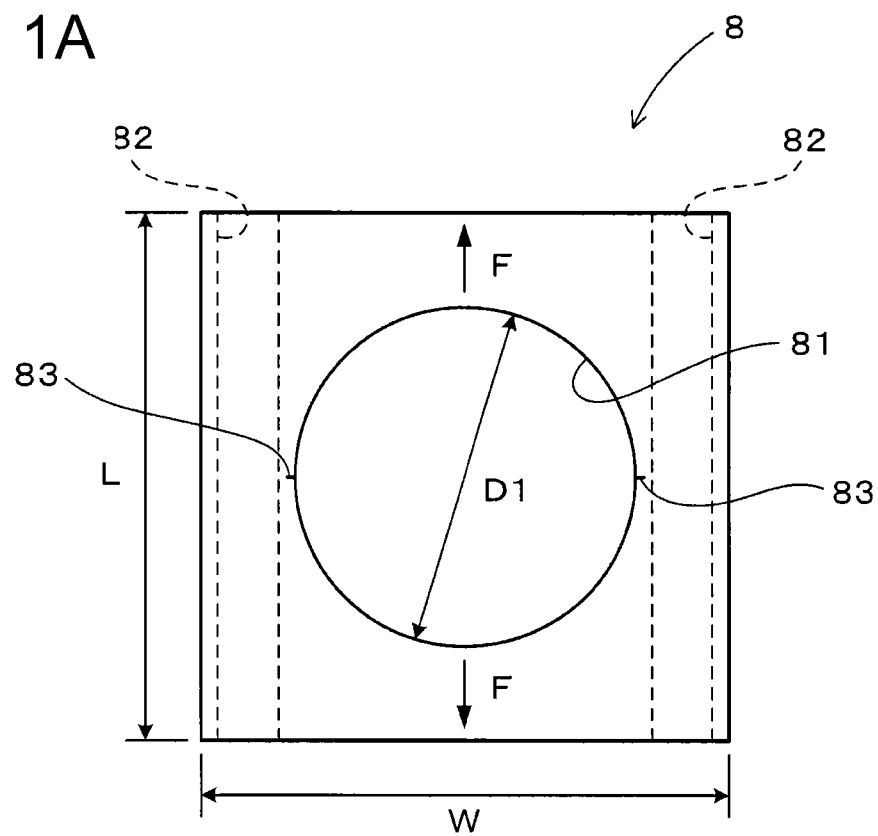

The reason for limiting the chemical composition in the above forged component will be described.

C: 0.30 to 0.45%,

C (carbon) is a basic element for securing strength. In order to obtain proper strength, hardness, and a Charpy impact value and to secure proper machinability, it is important to set C content in the above range. When C content is less than the lower limit, it is difficult to secure strength and the like, and a deformation may occur during fracture splitting. When C content exceeds the upper limit, there may be problems such as deterioration of machinability and chipping during fracture splitting. Note that in order to obtain a tensile strength of more than 1100 MPa, C is preferably contained in an amount of 0.35% or more.

Si: 0.05 to 0.35%,

Si (silicon) is an element which is not only effective as a deoxidizer during steel manufacture but also effective for improvement in strength and fracture splittability. In order to obtain these effects, Si needs to be added in an amount of the lower limit or more. On the other hand, when Si content is too high, decarbonization may increase, and an adverse influence may occur in fatigue strength. Therefore, Si content is set to the upper limit or less.

Mn: 0.50 to 0.90%,

Mn (manganese) is an element effective for deoxidation during steel manufacture and for adjusting the strength and toughness balance of steel. In order to optimize metal structure and improve machinability and fracture splittability in addition to the adjustment of strength and toughness balance, it is necessary to set Mn content within the above range. When Mn content is less than the lower limit, deterioration of strength and deformation during fracture splitting may occur. When Mn content exceeds the upper limit, machinability may be deteriorated by an increase in perlite or precipitation of bainite.

P: 0.030 to 0.070%,

P (phosphorus) is an element which affects fracture splittability. Therefore, by limiting P content to the above range, a proper Charpy impact value is easily obtained, and suppression of deformation and chipping during fracture splitting can be achieved. When P content is less than the lower limit, a problem of deformation during fracture splitting may occur. On the other hand, when P content exceeds the upper limit, a problem of chipping may occur during fracture splitting.

S: 0.040 to 0.070%,

S (sulfur) is an element effective for improving machinability. In order to obtain this effect, S is contained in an amount equal to the lower limit or more. On the other hand, since a crack is likely to occur during forging when S content is too high, S content is limited to the upper limit or less.

Cr: 0.01 to 0.50%,

Since Cr (chromium) is an element effective for adjusting the strength and toughness balance of steel similar to Mn, Cr is added in an amount equal to the lower limit or more. On the other hand, when Cr content is increased to an excessively high level, machinability may be deteriorated by an increase in perlite or precipitation of bainite in the same manner as in the case of Mn. Therefore, Cr content is limited to the upper limit or less.

Al: 0.001 to 0.050%,

Since Al (aluminum) is an element effective for deoxidation treatment, Al is added in an amount equal to the lower limit or more. On the other hand, since an increase in Al may cause deterioration of machinability due to an increase in an alumina-based inclusion, Al content is limited to the upper limit or less.

V: 0.25 to 0.35%,

V (vanadium) is an element which is finely precipitated in ferrite as carbonitride during cooling after hot forging and improves strength by precipitation strengthening. Therefore, V is added in an amount equal to the lower limit or more. On the other hand, since V greatly influences cost, V content is limited to the upper limit or less.

Ca: 0 to 0.0100% (Including the Case of 0%),

Since Ca (calcium) is effective for improving machinability, Ca can be optionally added. When Ca is not substantially contained, machinability improvement effect by Ca is naturally not obtained. However, necessary machinability can be secured as long as formula 1 is satisfied. Therefore, Ca is not an essential element but an optional element. On the other hand, since the machinability improvement effect by adding Ca is saturated even when the amount of Ca added is too high, the amount of Ca added is limited to the upper limit or less.

N: 0.0150% or Less,

N (nitrogen) is an element which is contained in the largest amount in air, and N is inevitably contained as an impurity when manufacturing is performed by melting in air. However, if N content exceeds the upper limit, N is combined with V in steel to form a large amount of relatively large carbonitride which does not contribute to strength improvement and may suppress the strength improvement effect by adding V. Therefore, N content is limited to the upper limit or less. Note that even when N content is within the above range, relatively coarse carbonitride which does not contribute to strength improvement may be increased in steel as N content increases. In order to avoid this phenomenon to secure the strength after forging, it is preferred to heat steel to a higher temperature during hot forging to dissolve the relatively coarse carbonitride.

As shown also in Table 1 to be described below, examples of unavoidable impurities in the above chemical composition include Cu, Ni, and Mo.

In addition to limiting the content range of each element as described above, the above chemical composition further needs to satisfy formula 1: [C]−4×[S]+[V]−25×[Ca]<0.44. Note that [X] means the value of mass % of an element X. For example, [C] means the value of the content (mass %) of C. The same may be said in the case of other elements. Further, the same may be said in formula 2 to be described below.

As described above, addition of Ca is effective in machinability improvement. On the other hand, when the content of elements other than Ca is in the above range and the above formula 1 is satisfied, good machinability can be obtained regardless of the addition of Ca. That is, when formula 1 is satisfied, good machinability can be naturally secured when Ca is contained in an amount of 0.0005% or more, and good machinability can be secured even when Ca is not added. Therefore, it is possible to increase the acceptable range of the amount of Ca added by setting formula 1 as an essential requirement.

Note that, with respect to formula 1, the relational expression of formula 1 was derived as follows. A large number of steel materials having various chemical components were prepared to acquire the data of the machinability index. The relationship between these data and the content of the elements of C, S, V, and Ca was analyzed by multiple linear regression analysis. The relational expression of formula 1 was derived from a threshold value from which machinability substantially equal to or higher than that of a reference material was obtained. The reason for having selected specific elements of C, S, V, and Ca is based on past findings that the above four elements have a great influence on machinability compared with other elements. After deriving formula 1 including the above four elements, the validity of the formula was verified.

Further, the steel forming the above forged component has a Vickers hardness in the range of 320 to 380 HV. Thereby, both high strength property and excellent machinability by adjustment of components described above can be achieved. When Vickers hardness is lower than the lower limit, it is difficult to achieve sufficient increase in strength. On the other hand, when Vickers hardness exceeds the upper limit, machinability may be deteriorated.

Further, the steel forming the above forged component has a 0.2% yield strength of 800 MPa or more. This allows sufficient increase in strength to be achieved and can contribute to the weight saving of a member.

Further, the Charpy V-notch impact value is in the range of 7 to 15 J/cm$^2$. Thereby, suppression of deformation and chipping during fracture splitting can be achieved, and very excellent fracture splittability can be obtained. When the above Charpy impact value is lower than the lower limit, chipping may occur during fracture splitting. On the other hand, when the above Charpy impact value is higher than the upper limit, deformation may be increased during fracture splitting.

Further, the metal structure of the steel forming the above forged component is a ferrite-pearlite structure, and the ferrite area ratio is 30% or more. Thereby, very excellent machinability can be obtained.

In order to obtain this ferrite-pearlite structure having a ferrite area ratio of 30% or more, it is preferred that each component range in the above specific chemical composition be satisfied, and in addition, the following formula 2 be further satisfied.

$$2.15 \leq 4\times[C]-[Si]+(1/5)\times[Mn]+7\times[Cr]-[V] \leq 2.61 \quad \text{Formula 2:}$$

Even in the case where each component range in the above specific chemical composition is satisfied, a case where the ferrite area ratio is less than 30% may occur when the above formula 2 is not satisfied. Therefore, it is effective to adjust the combination of each chemical component so that the above formula 2 is satisfied. Note that the ferrite area ratio is also influenced by manufacturing conditions such as conditions of hot forging and a cooling rate after hot forging. The conditions of hot forging and the cooling conditions after hot forging will be described below. In addition to these conditions, whether the above formula 2 is satisfied or not greatly influences the control of the ferrite area ratio. Consequently, it is important that the above formula 2 be satisfied.

Note that, with respect to formula 2, the relational expression of formula 2 was derived as follows. A large number of steel materials having various chemical components were prepared to acquire the data of the ferrite area ratio. The relationship between these data and the content of the elements of C, Si, Mn, Cr, and V was analyzed by multiple linear regression analysis. The relational expression of formula 2 was derived so that the ferrite area ratio might be 30% or more. The reason for having selected specific elements of C, Si, Mn, Cr, and V is based on past findings that the above five elements have a great influence on the metal structure after forging as compared with other elements. After deriving formula 2 including the above five elements, the validity of the formula was verified.

Further, a forged component having the above excellent properties can be applied to various members. Particularly, a manufacturing method utilizing fracture splitting can be applied to a connecting rod, and the above steel is very effectively applied to the connecting rod.

Further, in manufacturing the above forged component, at least the following steps are performed: a step of melting a raw material in an electric furnace or the like to produce a cast piece having the above specific chemical components and subjecting the cast piece to hot working such as hot rolling to prepare a steel material for forging; a step of subjecting the steel material for forging to hot forging; and a cooling step of cooling a forged product after hot forging. At this time, if the content of N is high, relatively coarse V carbonitride will be precipitated in larger amounts in a steel material for forging. Therefore, in order to precipitate fine carbonitride which contributes to strength improvement in the course of cooling of the forged product after hot forging, it is necessary to adjust hot forging temperature to a higher level as the N content is increased, thereby dissolving the relatively coarse carbonitride as described above.

Specifically, when N content is 0.0090% or less, the hot forging temperature may be 1150° C. or higher, which is not particularly different from the hot forging temperature in conventional hot forging. On the other hand, when N content exceeds 0.0090%, it is preferred to set hot forging temperature to a higher level of 1230° C. or higher so that V carbonitride in a steel material for forging can be dissolved in larger amounts. Note that even when N content is 0.0090% or less, it is not a problem that hot forging temperature is set to 1230° C. or higher. However, the upper limit temperature is preferably 1300° C. because if hot forging temperature is increased too much, crystal grains will be coarse, adversely affecting mechanical properties.

Further, in order to achieve a targeted high strength and hardness, and an impact value suitable for fracture splitting, a caution is required also for the cooling rate after hot forging. Specifically, the cooling is preferably performed so that the average cooling rate from 800 to 600° C. is 150 to 250° C./min. The lower limit of the average cooling rate is set to 150° C./min because, if the cooling rate is slow, it will be difficult to achieve a targeted high strength, hardness, and impact value. Further, the upper limit of the average cooling rate is set to 250° C./min because, if the cooling rate is higher than the upper limit, a bainite structure may be produced, which also prevents targeted mechanical properties from being achieved. The range of the cooling rate was set in the temperature range of 800 to 600° C. because the cooling rate in this temperature range has the greatest influence on mechanical properties.

EXAMPLES

Example 1

Examples of the above forged component will be described. As shown in Table 1, plural types of samples each having a different chemical composition were prepared in this example, and these samples were subjected to processing assuming the case where a connecting rod is produced, and the resulting samples were subjected to various evaluations. Note that the manufacturing method of each sample can be changed to any one of various known methods.

<Strength Evaluation Test>

A test piece for strength evaluation was prepared as follows. A cast piece produced by melting in an electric furnace was subjected to hot rolling to prepare a bar steel. The bar steel was subjected to extend forging to produce a round bar having a diameter of 20 mm as a steel material for forging. Subsequently, the round bar was heated to 1200° C. corresponding to a standard treatment temperature in actual hot forging and held at this temperature for 30 minutes. The heated round bar was then cooled by fan cooling to room temperature under the condition that the average cooling rate from 800 to 600° C. is about 190° C./min.

The evaluation of strength was performed on the following items.

Measurement of hardness: Vickers hardness was measured according to JIS Z 2244.

Measurement of tensile strength and 0.2% yield strength: The tensile strength and 0.2% yield strength were determined by performing a tensile test according to JIS Z 2241.

Ferrite area ratio: A section of a test piece was subjected to Nital corrosion and then observed with an optical microscope. The area ratio was determined by point counting according to JIS G0551.

Charpy impact value: The Charpy impact value was determined by performing the Charpy V-notch impact test according to JIS Z 2242.

When Vickers hardness was in the range of 320 to 380 HV, hardness was determined to be good, and otherwise hardness was determined to be poor. When 0.2% yield strength was 800 MPa or more, 0.2% yield strength was determined to be good, and otherwise 0.2% yield strength was determined to be poor. When a Charpy V-notch impact value was in the range of 7 to 15 J/cm$^2$, the Charpy V-notch

TABLE 1

| | Sample No. | Chemical composition (mass %) | | | | | | | | | | | | | | Formula 1 | Formula 2 |
| --- | --- | --- | --- | --- | --- | --- | --- | --- | --- | --- | --- | --- | --- | --- | --- | --- | --- |
| | | C | Si | Mn | P | S | Cu | Ni | Cr | Mo | Al | V | Ca | N | Fe | | |
| Example | E1 | 0.31 | 0.22 | 0.75 | 0.037 | 0.059 | 0.09 | 0.05 | 0.19 | 0.027 | 0.012 | 0.33 | 0.0035 | 0.0071 | bal. | 0.317 | 2.17 |
| | E2 | 0.30 | 0.25 | 0.75 | 0.040 | 0.060 | 0.10 | 0.05 | 0.20 | 0.025 | 0.008 | 0.31 | 0.0020 | 0.0060 | bal. | 0.320 | 2.19 |
| | E3 | 0.31 | 0.22 | 0.75 | 0.036 | 0.054 | 0.09 | 0.06 | 0.19 | 0.027 | 0.008 | 0.34 | 0.0033 | 0.0068 | bal. | 0.352 | 2.16 |
| | E4 | 0.33 | 0.24 | 0.74 | 0.038 | 0.059 | 0.10 | 0.05 | 0.18 | 0.022 | 0.005 | 0.30 | 0.0018 | 0.0058 | bal. | 0.349 | 2.19 |
| | E5 | 0.31 | 0.22 | 0.68 | 0.059 | 0.057 | 0.10 | 0.05 | 0.20 | 0.021 | 0.007 | 0.33 | 0.0018 | 0.0055 | bal. | 0.367 | 2.23 |
| | E6 | 0.32 | 0.25 | 0.61 | 0.059 | 0.057 | 0.10 | 0.05 | 0.20 | 0.021 | 0.007 | 0.30 | 0.0018 | 0.0086 | bal. | 0.347 | 2.25 |
| | E7 | 0.34 | 0.23 | 0.73 | 0.059 | 0.062 | 0.11 | 0.05 | 0.20 | 0.022 | 0.012 | 0.34 | 0.0026 | 0.0060 | bal. | 0.367 | 2.34 |
| | E8 | 0.38 | 0.08 | 0.74 | 0.032 | 0.056 | 0.10 | 0.04 | 0.19 | 0.027 | 0.009 | 0.32 | 0.0029 | 0.0065 | bal. | 0.404 | 2.60 |
| | E9 | 0.43 | 0.15 | 0.65 | 0.052 | 0.051 | 0.10 | 0.05 | 0.15 | 0.0281 | 0.003 | 0.27 | 0.0023 | 0.0054 | bal. | 0.439 | 2.48 |
| | E10 | 0.39 | 0.34 | 0.52 | 0.042 | 0.050 | 0.10 | 0.04 | 0.20 | 0.023 | 0.004 | 0.30 | 0.0031 | 0.0056 | bal. | 0.413 | 2.42 |
| | E11 | 0.45 | 0.23 | 0.58 | 0.065 | 0.065 | 0.10 | 0.05 | 0.12 | 0.025 | 0.005 | 0.25 | 0.0015 | 0.0078 | bal. | 0.403 | 2.28 |
| | E12 | 0.38 | 0.23 | 0.88 | 0.047 | 0.061 | 0.10 | 0.05 | 0.20 | 0.028 | 0.003 | 0.26 | 0.0022 | 0.0071 | bal. | 0.341 | 2.61 |
| | E13 | 0.37 | 0.24 | 0.72 | 0.056 | 0.059 | 0.10 | 0.05 | 0.20 | 0.022 | 0.005 | 0.33 | 0.0034 | 0.0064 | bal. | 0.379 | 2.45 |
| | E14 | 0.31 | 0.27 | 0.71 | 0.052 | 0.056 | 0.11 | 0.05 | 0.22 | 0.024 | 0.004 | 0.34 | 0.0002 | 0.0074 | bal. | 0.421 | 2.31 |
| | E15 | 0.35 | 0.30 | 0.65 | 0.045 | 0.058 | 0.10 | 0.04 | 0.23 | 0.014 | 0.005 | 0.32 | 0.0002 | 0.0065 | bal. | 0.433 | 2.52 |
| | E16 | 0.40 | 0.15 | 0.60 | 0.054 | 0.065 | 0.10 | 0.05 | 0.15 | 0.042 | 0.008 | 0.28 | 0.0001 | 0.0077 | bal. | 0.418 | 2.34 |
| | E17 | 0.33 | 0.25 | 0.78 | 0.050 | 0.048 | 0.09 | 0.06 | 0.18 | 0.031 | 0.010 | 0.30 | 0.0001 | 0.0059 | bal. | 0.436 | 2.19 |
| Comparative Example | C1 | 0.29 | 0.22 | 0.71 | 0.042 | 0.052 | 0.09 | 0.05 | 0.19 | 0.027 | 0.006 | 0.29 | 0.0028 | 0.0065 | bal. | 0.302 | 2.12 |
| | C2 | 0.35 | 0.25 | 0.45 | 0.048 | 0.052 | 0.02 | 0.05 | 0.03 | 0.040 | 0.007 | 0.31 | 0.0031 | 0.0044 | bal. | 0.375 | 1.14 |
| | C3 | 0.35 | 0.25 | 0.55 | 0.034 | 0.060 | 0.10 | 0.05 | 0.55 | 0.025 | 0.008 | 0.34 | 0.0018 | 0.0050 | bal. | 0.405 | 4.77 |
| | C4 | 0.32 | 0.10 | 0.75 | 0.027 | 0.060 | 0.10 | 0.05 | 0.20 | 0.025 | 0.005 | 0.30 | 0.0020 | 0.0060 | bal. | 0.330 | 2.43 |
| | C5 | 0.33 | 0.24 | 1.04 | 0.037 | 0.053 | 0.10 | 0.05 | 0.15 | 0.025 | 0.010 | 0.27 | 0.0011 | 0.0053 | bal. | 0.361 | 2.07 |
| | C6 | 0.32 | 0.33 | 0.65 | 0.075 | 0.054 | 0.10 | 0.05 | 0.12 | 0.032 | 0.005 | 0.32 | 0.0018 | 0.0079 | bal. | 0.379 | 1.60 |
| | C7 | 0.47 | 0.27 | 0.54 | 0.054 | 0.062 | 0.05 | 0.05 | 0.02 | 0.050 | 0.011 | 0.27 | 0.0024 | 0.0065 | bal. | 0.432 | 1.59 |
| | C8 | 0.36 | 0.25 | 0.68 | 0.062 | 0.035 | 0.01 | 0.05 | 0.04 | 0.030 | 0.004. | 0.32 | 0.00281 | 0.0058 | bal. | 0.470 | 1.29 |
| | C9 | 0.37 | 0.27 | 0.70 | 0.057 | 0.049 | 0.12 | 0.06 | 0.14 | 0.024 | 0.008 | 0.29 | 0.0003 | 0.0075 | bal. | 0.457 | 2.04 |
| | C10 | 0.38 | 0.32 | 0.68 | 0.049 | 0.052 | 0.10 | 0.05 | 0.42 | 0.032 | 0.006 | 0.21 | 0.0023 | 0.0078 | bal. | 0.325 | 4.07 |
| | C11 | 0.36 | 0.24 | 0.73 | 0.045 | 0.057 | 0.09 | 0.04 | 0.36 | 0,006 | 0.004 | 0.38 | 0.0032 | 0.0085 | bal. | 0.432 | 3.49 |
| | C12 | 0.40 | 0.25 | 0.53 | 0.055 | 0.057 | 0.10 | 0.05 | 0.21 | 0.039 | 0.006 | 0.29 | 0.0027 | 0.0070 | bal. | 0.395 | 2.64 | impact value was determined to be good, and otherwise the Charpy V-notch impact value was determined to be poor.

<Machinability Evaluation Test>

A test piece for machinability evaluation was prepared as follows. A cast piece produced by melting in an electric furnace was subjected to hot rolling to prepare a bar steel. The bar steel was subjected to extend forging to produce a square bar having a square cross section 25 mm on a side as a steel material for forging. Subsequently, the square bar was heated to 1200° C. corresponding to a standard treatment temperature in actual hot forging and held at this temperature for 30 minutes. The heated square bar was then cooled by fan cooling to room temperature under the condition that the average cooling rate from 800 to 600° C. is about 190° C./min. The cooled square bar was machined into a square bar having a square cross section 20 mm on a side, which was used as a test piece for machinability evaluation.

The machinability test was performed by drilling with a drill. The test conditions are as follows.

The drill used: a high-speed steel drill having a diameter of 8 mm
Drill number of revolutions: 800 rpm
Feed: 0.20 mm/rev
Machining depth: 11 mm
The number of machined holes: 300 holes (not cut through)

Measurement of a drill abrasion loss was performed in a flank corner part of the drill after machining 300 holes. The machinability index was calculated by setting the drill abrasion loss of a reference material to 1 and determining the proportion of the drill abrasion loss of each sample when compared with that of the reference material. As the reference material was used conventional JIS carbon steel for machinery (hardness: 250 HV) having a chemical composition of C: 0.23%, Si: 0.25%, Mn: 0.80%, Cr: 0.2%, and the balance being Fe and unavoidable impurities. This conventional steel was used as a reference material because this conventional steel had a significantly low hardness as compared with the steel according to the present application and had satisfactory machinability in manufacturing even if an element for improving machinability such as S is not added. Then, when the machinability index was 1.20 or less, machinability was determined to be good, and when the machinability index was more than 1.20, machinability was determined to be poor.

<Fracture Splittability Evaluation Test>

Figure 1B:
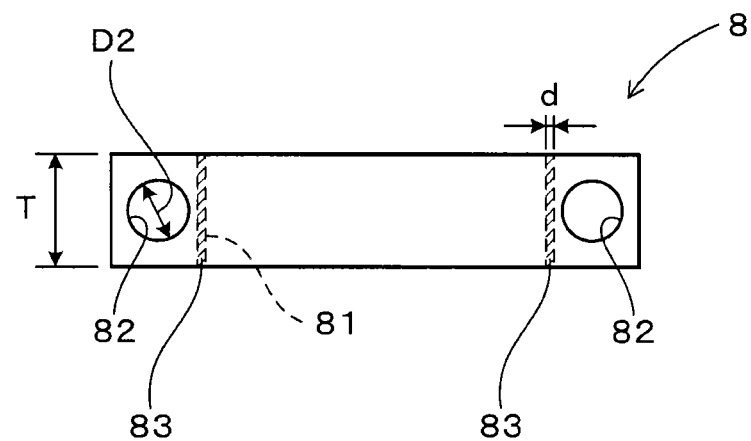

A test piece for fracture splittability evaluation was produced as follows. First, a cast piece produced by melting in an electric furnace was subjected to hot rolling to prepare a bar steel. The bar steel was subjected to extend forging to produce a plate material having a size of 75 mm in length× 75 mm in width×25 mm in thickness as a steel material for forging. Subsequently, the plate material was heated to 1200° C. corresponding to a standard treatment temperature in actual hot forging and held at this temperature for 30 minutes. The heated plate material was then cooled by fan cooling to room temperature under the condition that the average cooling rate from 800 to 600° C. is about 190° C./min. Subsequently, as shown in FIG. 1, a test piece 8 for fracture splittability evaluation was obtained by processing the above plate material so that the test piece has a shape having an outer dimension of 70 mm in length L×70 mm in width W×20 mm in thickness T and a through hole 81 having a diameter D1=45 mm passing through the test piece in the thickness direction at the center, assuming the large end of a connecting rod. As shown in FIG. 1, in the test piece 8 for fracture splittability evaluation, a pair of parallel through holes 82 each having a diameter D2=8 mm which pass through in the length direction were provided along a pair of parallel outlines, and a pair of notches 83 were provided in the inner circumferential wall of the through hole 81. The notch 83 was cut with laser and had a depth d of 1 mm. Further, the notches 83 were provided at two positions which were located 90 degrees relative to the length direction, that is, two positions nearest to the above through hole 82.

The fracture splitting (cracking) was performed by a method including inserting a jig (not shown) into the through hole 81 and applying an impact load in the direction of arrow F, as shown in FIG. 1.

The fracture splittability was evaluated by combining fracture-split test pieces into the undivided state after fracture splitting, fastening the fracture-split test pieces with bolts utilizing the above through holes 82, and measuring the inner diameter dimension of the through hole 81 before and after fracture splitting to determine the amount of dimensional change. For each sample, ten tests (n=10) were performed, respectively. When the dimensional change was 10 m or less and chips did not occur on the fracture surface in all the tests, the fracture splittability was determined to be good, and otherwise the fracture splittability was determined to be poor.

Each evaluation result is shown in Table 2.

TABLE 2

| | Sample No. | Hardness HV | Tensile strength MPa | 0.2% yield strength MPa | Yield ratio | Ferrite area ratio % | Charpy impact value J/cm$^2$ | Fracture splittability | Machinability index |
|---|---|---|---|---|---|---|---|---|---|
| Example | E1 | 344 | 1080 | 862 | 0.799 | 68 | 11.89 | Good | 0.96 |
| | E2 | 333 | 1130 | 907 | 0.803 | 73 | 10.28 | Good | 0.87 |
| | E3 | 356 | 1105 | 872 | 0.789 | 69 | 9.86 | Good | 0.99 |
| | E4 | 334 | 1070 | 860 | 0.804 | 58 | 8.09 | Good | 0.90 |
| | E5 | 328 | 1048 | 827 | 0.789 | 68 | 11.80 | Good | 0.96 |
| | E6 | 325 | 1032 | 807 | 0.782 | 63 | 10.86 | Good | 0.91 |
| | E7 | 352 | 1055 | 840 | 0.796 | 53 | 7.95 | Good | 0.85 |
| | E8 | 370 | 1274 | 968 | 0.760 | 30 | 7.45 | Good | 1.18 |
| | E9 | 370 | 1263 | 971 | 0.769 | 33 | 8.15 | Good | 1.15 |
| | E10 | 358 | 1153 | 915 | 0.794 | 39 | 9.34 | Good | 0.99 |
| | E11 | 369 | 1202 | 910 | 0.757 | 32 | 8.19 | Good | 1.08 |
| | E12 | 364 | 1148 | 913 | 0.795 | 30 | 7.35 | Good | 1.06 |
| | E13 | 357 | 1119 | 872 | 0.779 | 48 | 9.85 | Good | 0.95 |
| | E14 | 352 | 1157 | 936 | 0.809 | 66 | 7.10 | Good | 1.17 |

TABLE 2-continued

|  | Sample No. | Hardness HV | Tensile strength MPa | 0.2% yield strength MPa | Yield ratio | Ferrite area ratio % | Charpy impact value J/cm$^2$ | Fracture splittability | Machinability index |
|---|---|---|---|---|---|---|---|---|---|
|  | E15 | 363 | 1169 | 936 | 0.801 | 50 | 8.57 | Good | 1.19 |
|  | E16 | 348 | 1153 | 865 | 0.750 | 44 | 9.07 | Good | 1.10 |
|  | E17 | 345 | 1141 | 916 | 0.803 | 58 | 7.75 | Good | 1.15 |
| Comparative | C1 | 305 | 1002 | 756 | 0.754 | 74 | 25.53 | Large deformation | 0.89 |
| Example | C2 | 307 | 1040 | 796 | 0.765 | 87 | 16.45 | Large deformation | 0.86 |
|  | C3 | 375 | 1282 | 1019 | 0.795 | 18 | 5.38 | Occurrence of chips | 1.58 |
|  | C4 | 328 | 1068 | 842 | 0.788 | 73 | 15.46 | Large deformation | 0.92 |
|  | C5 | 355 | 1145 | 808 | 0.706 | 27 | 6.47 | Occurrence of chips | 1.43 |
|  | C6 | 338 | 1129 | 877 | 0.777 | 69 | 5.06 | Occurrence of chips | 0.93 |
|  | C7 | 371 | 1205 | 877 | 0.728 | 24 | 4.81 | Occurrence of chips | 1.42 |
|  | C8 | 349 | 1139 | 902 | 0.792 | 62 | 7.39 | Good | 1.27 |
|  | C9 | 354 | 1170 | 890 | 0.761 | 49 | 8.79 | Good | 1.31 |
|  | C10 | 334 | 1091 | 782 | 0.717 | 31 | 9.18 | Good | 0.83 |
|  | C11 | 396 | 1334 | 1098 | 0.823 | 36 | 6.41 | Occurrence of chips | 1.65 |
|  | C12 | 355 | 1178 | 905 | 0.768 | 27 | 5.28 | Occurrence of chips | 1.44 |

Table 2 reveals that the samples E1 to E17 provide good results for all the evaluation items and are excellent in all three properties of strength, machinability, and fracture splittability. Among these samples, the samples E14 to E17 contain Ca only as an impurity but are found to satisfy the necessary machinability because components have been adjusted so that formula 1 is satisfied by optimizing components other than Ca.

Further, the samples E1 to E17 are not only excellent in fracture splittability but also excellent in all other properties, and each has a Charpy impact value of 7 J/cm$^2$ or more. Therefore, these samples can be used without anxiety over a long period of time irrespective of being subjected to fracture splitting or not. Therefore, these samples can be suitably used not only for components that require fracture separation but also for components that does not require fracture separation.

On the other hand, since the sample C1 had too low a C content, strength property such as hardness and 0.2% yield strength were low, and the Charpy impact value was high. This resulted in large deformation in fracture splittability evaluation.

Similarly, since the sample C2 had too low a Mn content, strength property such as hardness and 0.2% yield strength were low, and the Charpy impact value was high. This resulted in large deformation in fracture splittability evaluation.

Since the sample C3 had too high a Cr content, the ferrite area ratio in metal structure was reduced to thereby reduce the Charpy impact value. This resulted in occurrence of chips in fracture splittability evaluation and low machinability.

Since the sample C4 had too low a P content, the impact value was increased. This resulted in large deformation in fracture splittability evaluation.

Since the sample C5 had too high a Mn content, the ferrite area ratio in metal structure was reduced to thereby reduce the Charpy impact value. This resulted in occurrence of chips in fracture splittability evaluation and low machinability.

Since the sample C6 had too high a P content, the Charpy impact value was reduced, leading to occurrence of chips in fracture splittability evaluation.

Since the sample C7 had too high a C content, the Charpy impact value was reduced, leading to occurrence of chips in fracture splittability evaluation, and the ferrite area ratio in metal structure was reduced, resulting in low machinability.

The sample C8 had too low a S content and did not satisfy formula 1, thereby resulting in low machinability.

The sample C9 did not satisfy formula 1, thereby resulting in low machinability.

The sample C10 had too low a V content, thereby resulting in low 0.2% yield strength.

Since the sample C11 had too high a V content, the Charpy impact value was reduced, leading to occurrence of chips in fracture splittability evaluation, and the hardness increased too much, resulting in low machinability.

In the sample C12, each chemical component is within the range of the present invention but does not satisfy the relationship of formula 2. Therefore, the ferrite area ratio was less than 30%. This resulted in deterioration of machinability and a low Charpy impact value, leading to occurrence of chips in fracture splittability evaluation. This result reveals that when at least the manufacturing method of this example is employed, it is effective to optimize the ferrite area ratio that not only each chemical component is limited, but also the relationship of formula 2 is satisfied.

Figure 2:
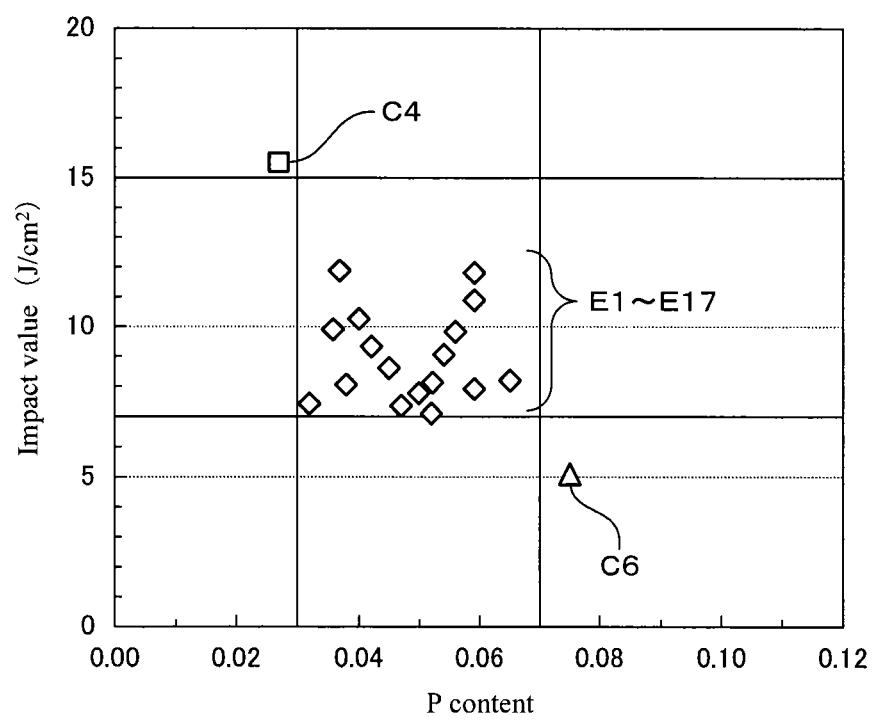
FIG. 2 is an explanatory view showing the relationship between P content and a Charpy impact value in Example 1.

Next, the relationship between P content and a Charpy impact value is shown in FIG. 2. In FIG. 2, the axis of abscissas denotes P content (mass %), and the axis of ordinates denotes a Charpy impact value (J/cm$^2$). Then, the data of the samples E1 to E17 and the samples C4 and C6 were plotted. FIG. 2 reveals that, in order to limit the above Charpy impact value within the range of 7 to 15 J/cm$^2$, it is effective to at least limit P content within the range of 0.030 to 0.070%.

Figure 3:
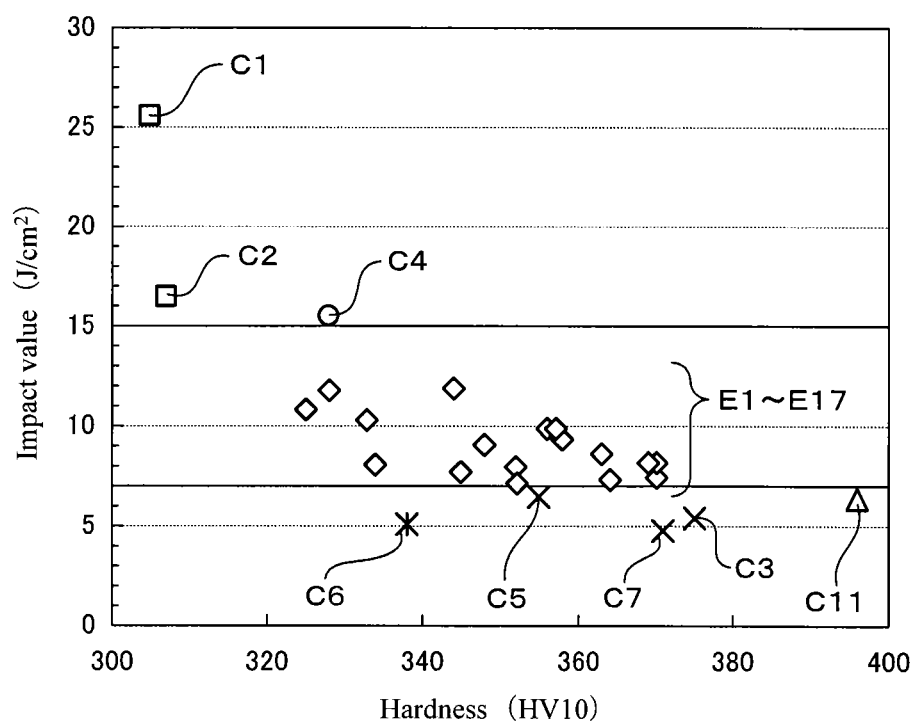
FIG. 3 is an explanatory view showing the relationship between hardness and a Charpy impact value in Example 1.

FIG. 3 shows the relationship between hardness and a Charpy impact value. In FIG. 3, the axis of abscissas denotes hardness (HV10), and the axis of ordinates denotes a Charpy impact value (J/cm$^2$). Then, the data of the samples E1 to E17 and the samples C1 to C7 and C11 were plotted. FIG. 3 reveals that it is difficult to limit the above Charpy impact value within the range of 7 to 15 J/cm$^2$ only by limiting hardness, and the sample C1 shows the necessity of optimizing C content; the sample C2 shows the necessity of optimizing Mn content; the sample C4 and the sample C6 show the necessity of optimizing P content; the samples C3, C5, and C7 show the necessity of optimizing the ferrite area ratio; and the sample C11 shows the necessity of optimizing V content.

Figure 4:
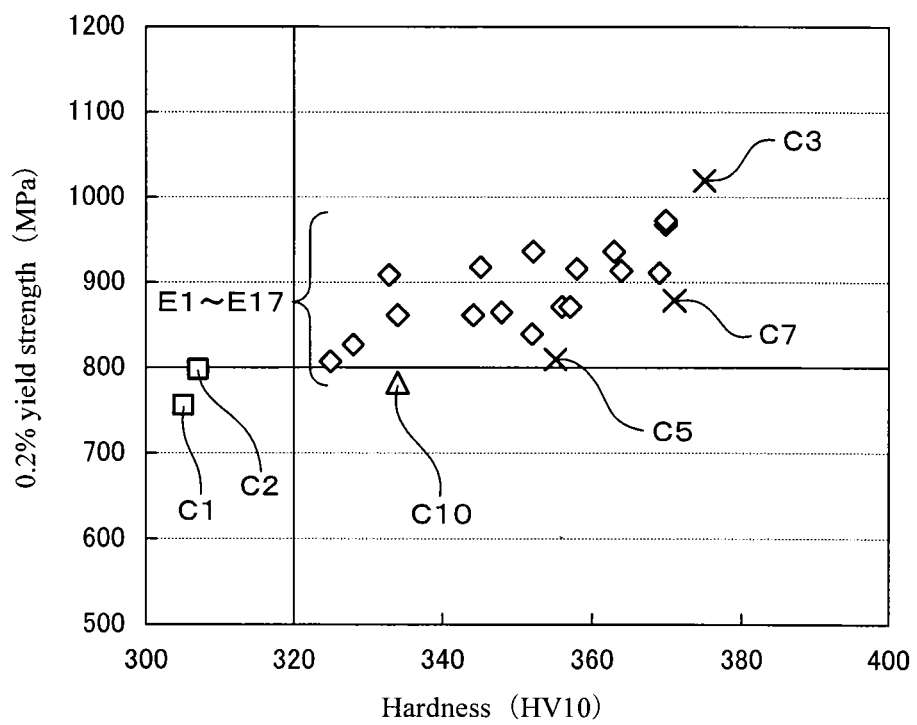
FIG. 4 is an explanatory view showing the relationship between hardness and 0.2% yield strength in Example 1.

FIG. 4 shows the relationship between hardness and 0.2% yield strength. In FIG. 4, the axis of abscissas denotes hardness (HV10), and the axis of ordinates denotes 0.2% yield strength (MPa). Then, the data of the samples E1 to E17 and the samples C1 to C3, C5, C7, and C10 were plotted. FIG. 4 reveals that, in the case where hardness is less than 320 HV, 0.2% yield strength is less than 800 MPa; on the other hand, even in the case where hardness is 320 HV or more, 0.2% yield strength is less than 800 MPa when V content is less than 0.25%, and 0.2% yield strength is less than 800 MPa when N content is higher than 0.0090%.

Figure 5:
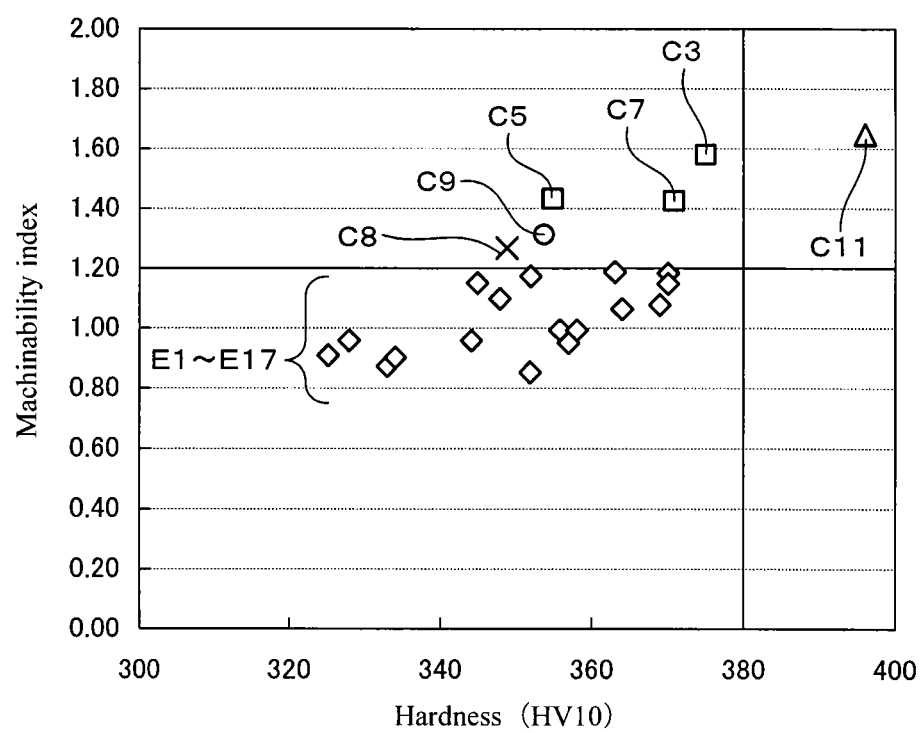
FIG. 5 is an explanatory view showing the relationship between hardness and a machinability index in Example 1.

FIG. 5 shows the relationship between hardness and a machinability index. In FIG. 5, the axis of abscissas denotes hardness (HV10), and the axis of ordinates denotes a machinability index. Then, the data of the samples E1 to E17 and the samples C3, C5, C7 to C9, and C11 were plotted. FIG. 5 reveals that machinability is reduced in the case where hardness is higher than 380 HV; on the other hand, even in the case where hardness is 380 HV or less, machinability is reduced when the ferrite area ratio is less than 30%, and machinability is reduced also when S content is less than 0.040%.

Figure 6:
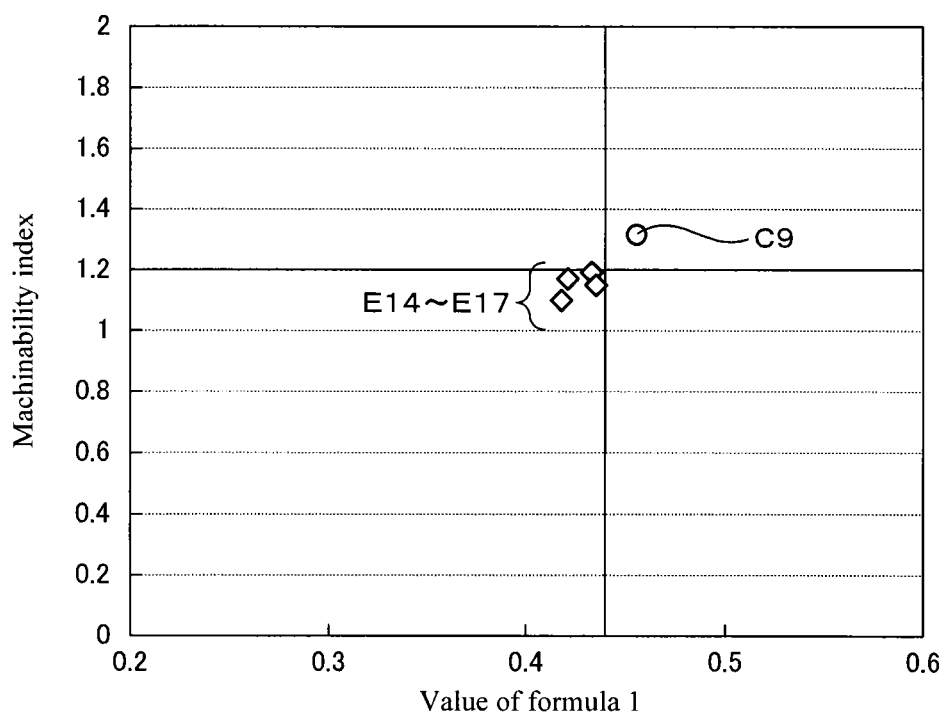
FIG. 6 is an explanatory view showing the relationship between a value of formula 1 and a machinability index in Example 1.

FIG. 6 shows the relationship between a value of formula 1 and a machinability index. In FIG. 6, the axis of abscissas denotes a value of formula 1, and the axis of ordinates denotes a machinability index. Then, the data of the samples E14 to E17 and the sample C9 were plotted. That is, in order to verify that machinability is satisfied when formula 1 is satisfied even if Ca content is low, only the samples in which Ca content was less than 0.0005% and the content range of each component was appropriate were plotted among the samples subjected to experiment in this example. Among the plotted data, only the sample C9 did not satisfy formula 1, and other samples satisfied formula 1. FIG. 6 reveals that even when Ca content is less than 0.0005%, machinability can be secured when formula 1 is satisfied.

Example 2

In this example, a plurality of samples shown in Table 3 were prepared and investigated for the influence of N content and V content on the properties of steel. Further, the influence of heating temperature during hot forging was also investigated. As shown in Table 3, the samples E21, E22, and C21 each have a V content of 0.32% and a N content different from each other. The samples E31, E32, and C31 each have a V content of 0.28% and a N content different from each other. Note that components other than V and N have been adjusted so that the content of these components may be at substantially the same level between the three samples of E21, E22, and C21 and the three samples of E31, E32, and C31.

TABLE 3

| Sample | Chemical composition (mass %) | | | | | | | | | | | | | |
|---|---|---|---|---|---|---|---|---|---|---|---|---|---|---|
| No. | C | Si | Mn | P | S | Cu | Ni | Cr | Mo | Al | V | Ca | N | Fe |
| E21 | 0.33 | 0.22 | 0.73 | 0.043 | 0.058 | 0.09 | 0.06 | 0.21 | 0.031 | 0.009 | 0.32 | 0.0023 | 0.0088 | bal. |
| E22 | 0.34 | 0.22 | 0.79 | 0.036 | 0.061 | 0.09 | 0.06 | 0.20 | 0.028 | 0.007 | 0.32 | 0.0031 | 0.0120 | bal. |
| C21 | 0.34 | 0.22 | 0.74 | 0.047 | 0.053 | 0.09 | 0.06 | 0.20 | 0.033 | 0.010 | 0.32 | 0.0026 | 0.0160 | bal. |
| E31 | 0.38 | 0.23 | 0.72 | 0.050 | 0.055 | 0.09 | 0.06 | 0.20 | 0.035 | 0.008 | 0.28 | 0.0034 | 0.0082 | bal. |
| E32 | 0.38 | 0.25 | 0.70 | 0.048 | 0.052 | 0.10 | 0.05 | 0.21 | 0.033 | 0.011 | 0.28 | 0.0014 | 0.0145 | bal. |
| C31 | 0.37 | 0.23 | 0.68 | 0.046 | 0.056 | 0.10 | 0.05 | 0.21 | 0.033 | 0.010 | 0.28 | 0.0022 | 0.0164 | bal. |

Figure 7:
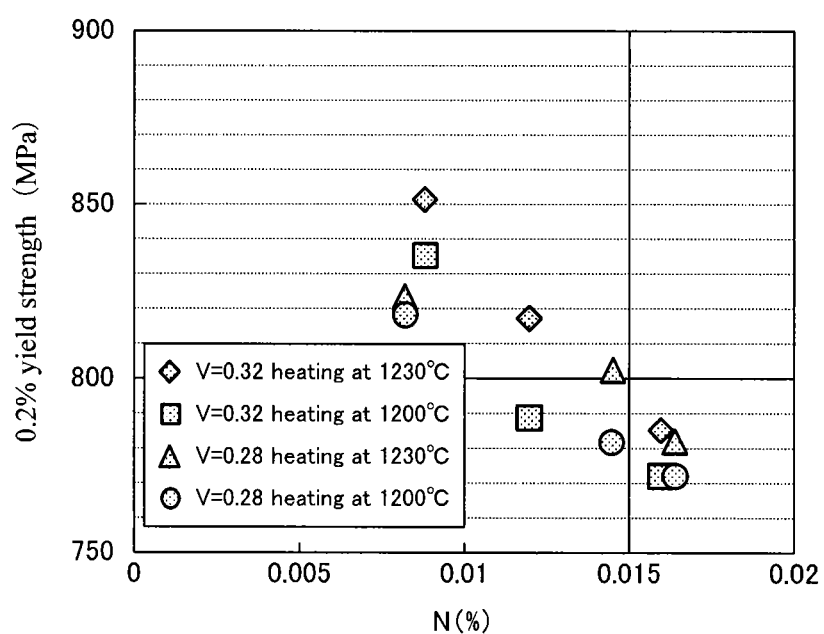
FIG. 7 is an explanatory view showing the relationship between N content and heating temperature and 0.2% yield strength in Example 2.

The manufacturing method of each sample is basically the same as in the case of Example 1 described above, and the heating temperature during hot forging was set to the temperature shown in Table 4. The test method of the obtained samples was also the same as in the case of Example 1 described above. The test results are shown in Table 4. Further, FIG. 7 shows the relationship between N content and heating temperature and 0.2% yield strength.

TABLE 4

| Sample No. | Heating temperature during hot forging | Hardness HV | Tensile strength MPa | 0.2% yield strength MPa | Yield ratio | Ferrite area ratio % | Charpy impact value J/cm$^2$ |
|---|---|---|---|---|---|---|---|
| E21 | 1250° C. | 334 | 1089 | 861 | 0.790 | 54 | 7.52 |
| | 1230° C. | 333 | 1081 | 851 | 0.787 | 54 | 7.75 |
| | 1200° C. | 332 | 1068 | 835 | 0.782 | 55 | 8.10 |
| E22 | 1250° C. | 335 | 1093 | 836 | 0.765 | 47 | 8.39 |
| | 1230° C. | 336 | 1092 | 817 | 0.748 | 45 | 8.59 |
| | 1200° C. | 338 | 1092 | 788 | 0.722 | 43 | 8.88 |
| C21 | 1250° C. | 330 | 1067 | 794 | 0.740 | 51 | 9.59 |
| | 1230° C. | 329 | 1071 | 785 | 0.733 | 52 | 10.52 |
| | 1200° C. | 327 | 1054 | 772 | 0.723 | 53 | 11.91 |
| E31 | 1250° C. | 332 | 1065 | 826 | 0.783 | 33 | 10.64 |
| | 1230° C. | 329 | 1055 | 823 | 0.780 | 35 | 11.75 |
| | 1200° C. | 325 | 1055 | 818 | 0.775 | 38 | 13.41 |

TABLE 4-continued

| Sample No. | Heating temperature during hot forging | Hardness HV | Tensile strength MPa | 0.2% yield strength MPa | Yield ratio | Ferrite area ratio % | Charpy impact value J/cm² |
|---|---|---|---|---|---|---|---|
| E32 | 1250° C. | 329 | 1049 | 804 | 0.777 | 34 | 9.98 |
|  | 1230° C. | 326 | 1047 | 802 | 0.766 | 35 | 11.68 |
|  | 1200° C. | 321 | 1038 | 782 | 0.749 | 37 | 14.22 |
| C31 | 1250° C. | 328 | 1068 | 788 | 0.745 | 40 | 10.39 |
|  | 1230° C. | 325 | 1057 | 782 | 0.740 | 41 | 11.44 |
|  | 1200° C. | 321 | 1049 | 772 | 0.732 | 42 | 13.02 |

As apparent from Table 4 and FIG. 7, in the case where N content is 0.0090% or less, a 0.2% yield strength of 800 MPa or more can be secured even when hot forging temperature is 1200° C., but in the case where N content is more than 0.0090%, a 0.2% yield strength of 800 MPa or more may not be secured. However, it is found that even in the case where N content is more than 0.0090%, 0.2% yield strength can be 800 MPa or more by setting hot forging temperature to 1230° C. or more. On the other hand, in the case where N content is more than 0.015% (in the case of the samples C21 and C31), it was impossible to obtain a 0.2% yield strength of 800 MPa or more even when hot forging temperature was increased to 1250° C.

Example 3

In the examples described above, the cooling step after hot forging was performed under the condition that the average cooling rate from 800 to 600° C. was 190° C./min. In order to grasp the influence of the cooling rate in more detail, experiments in this example were performed using the sample E1 at an average cooling rate from 800 to 600° C. of 100° C./min and 300° C./min by adjusting the strength of a fan in fan cooling. Conditions other than the cooling rate were set to the same conditions as in Example 1.

As a result of the experiments, when the cooling rate was set to 100° C./min, both hardness and yield strength were found to be relatively low values of 312 HV and 769 MPa, respectively, while the impact value was found to be an excessively high value of 17.65 J/cm², resulting in deterioration of fracture splittability and large deformation.

Further, when the cooling rate was set to 300° C./min, a bainite structure was produced; the yield ratio which was 0.799 when the cooling rate was 100° C./min was deteriorated to 0.732; and the impact value was deteriorated to 6.44 J/cm², resulting in occurrence of chips during fracture splitting.

The above experimental results show that it is also important to adjust the cooling rate after hot forging.

The invention claimed is:

1. A forged component having a chemical composition consisting of, by mass %, C: 0.30 to 0.45%, Si: 0.05 to 0.35%, Mn: 0.50 to 0.90%, P: 0.030 to 0.070%, S: 0.040 to 0.070%, Cr: 0.01 to 0.50%, Al: 0.001 to 0.050%, V: 0.25 to 0.35%, N: 0.0150% or less, and the balance being Fe and unavoidable impurities, and satisfying the following formula 1:

[C]−4×[S]+[V]−25×[Ca]<0.44 (Formula 1)

wherein [X] means a value of the content (mass %) of an element X),
wherein a metal structure of the forged component is a ferrite pearlite structure, and
a ferrite area ratio is 30% or more;
a Vickers hardness of the forged component is in the range of 320 to 380 HV;
a 0.2% yield strength of the forged component is 800114 Pa or more; and
a Charpy V-notch impact value of the forged component is in the range of 7 to 15 J/cm².

2. The forged component according to claim 1 satisfying the following formula 2:

2.15≤4×[C]−[Si]+(⅕)×[Mn]+7×[Cr]−[V]≤2.61. (Formula 2)

3. A connecting rod comprising the forged component according to claim 1.

4. A connecting rod comprising the forged component according to claim 2.

* * * * *